UNITED STATES PATENT OFFICE.

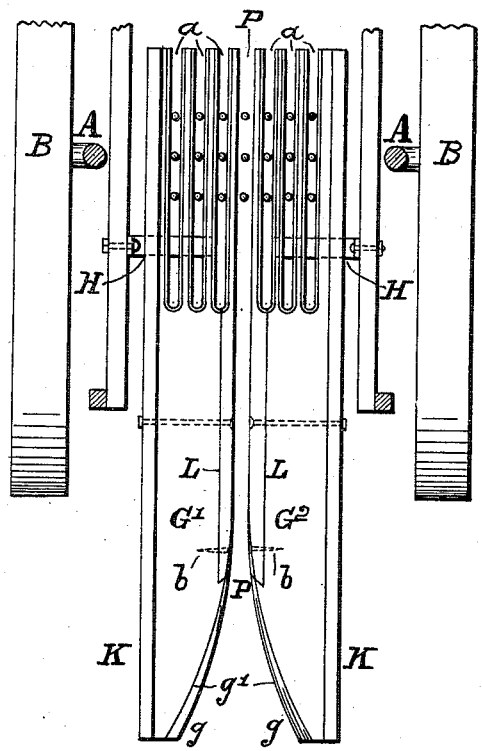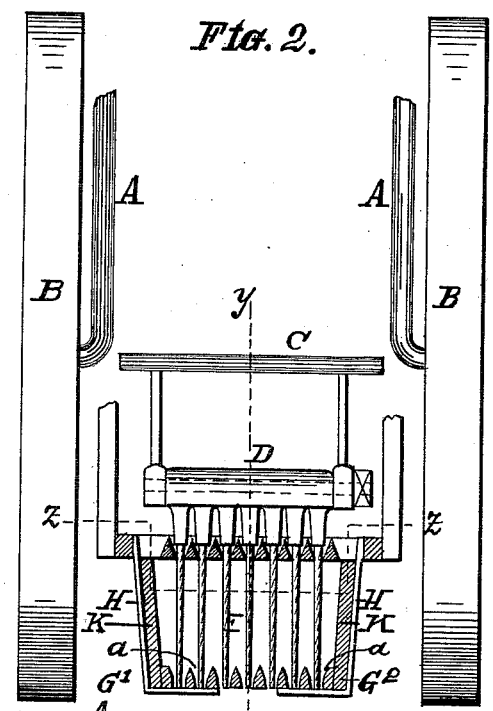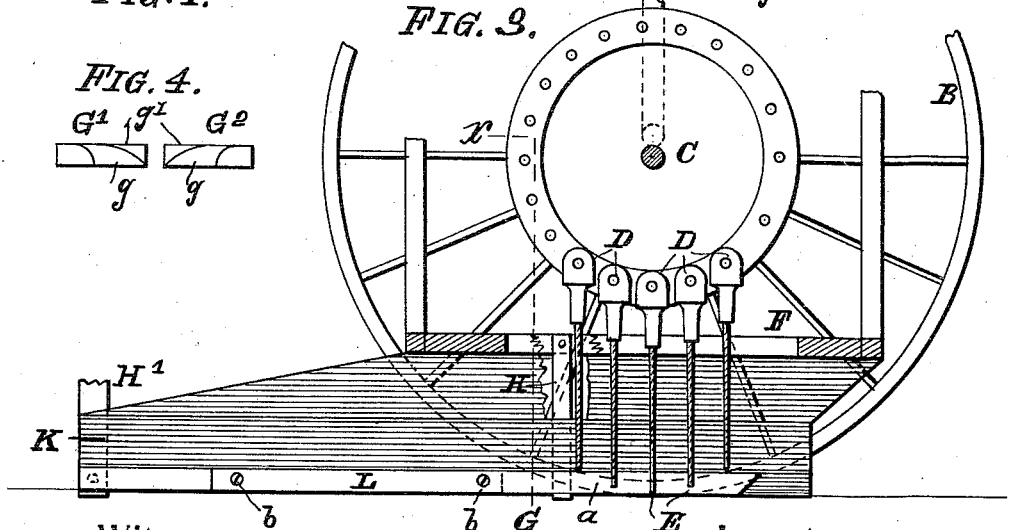

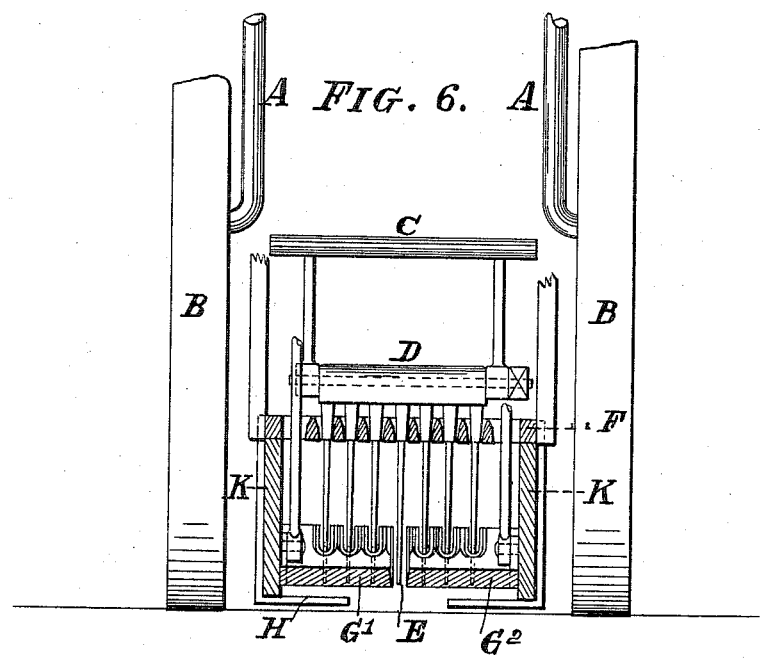
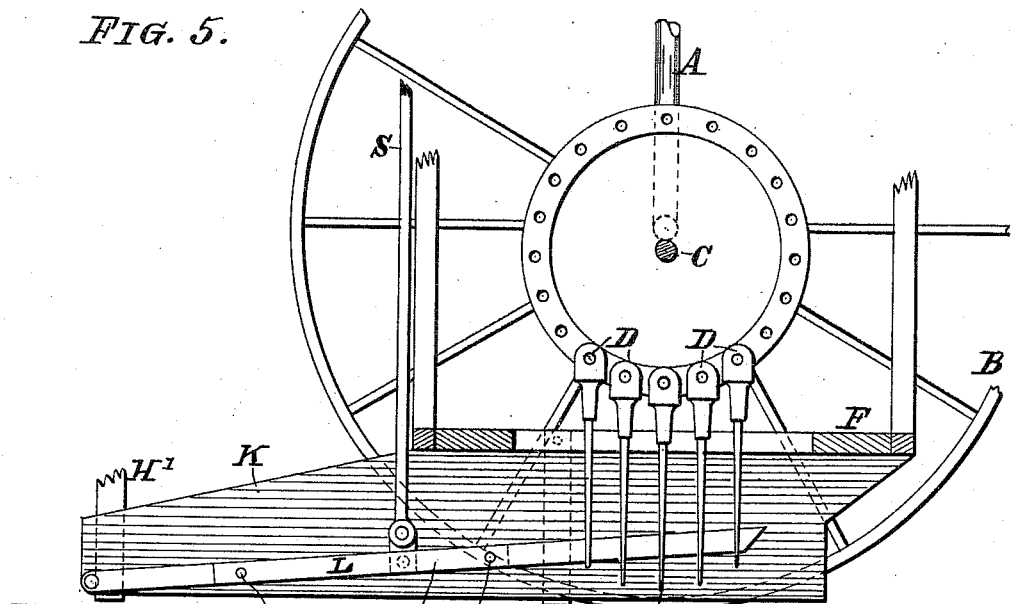

ORLEY C. HOUGHTON, OF CHICAGO, ILLINOIS, ASSIGNOR TO HENRY E. BULLOCK AND JAMES E. BULLOCK, BOTH OF CHICAGO, ILLINOIS.

COTTON-PICKER.

1,006,094.   Specification of Letters Patent.   Patented Oct. 17, 1911.

Application filed August 1, 1908. Serial No. 446,462.

*To all whom it may concern:*

Be it known that I, ORLEY C. HOUGHTON, a citizen of the United States, and a resident of Chicago, in the county of Cook, in the State of Illinois, have invented certain new and useful Improvements in Cotton-Pickers; and I do hereby declare that the following description of my said invention, taken in connection with the accompanying sheets of drawings, forms a full, clear, and exact specification, which will enable others skilled in the art to which it appertains to make and use the same.

This invention has general reference to improvements in cotton harvesters and especially that class of cotton pickers in which a series of intermittently-revolving fingers or spindles of peculiar design are employed to remove the lint from the bolls by twisting the same upon said spindles, and from whence the lint is removed by a series of strippers. In this class of pickers, an apron at the front of the machine serves to depress the cotton bushes so that they will be placed into the most effective position to remove the cotton while said spindles are revolving and passing through a grate above the bushes, as the machine is moved over the field. In this construction there are several serious defects which render it necessary that the machine is passed several times over the field because the bushes are not contracted, concentrated or compressed sufficiently for the most effective operation of the picking spindles. Furthermore, when the machine is moved over the field and the cotton bushes entered into the space below the grate which depresses the bushes, many of the branches will lie close to the ground, and in order to pick the lint therefrom it becomes necessary to have the revolving picking fingers reach down upon, and even into the ground. When the soil is damp or wet these fingers become soiled, the delicate teeth thereon rapidly worn and, should gravel, stones, or other obstacles be met, they are frequently bent or broken off, resulting in damage to the machine and delays in the harvesting.

To overcome these objections, which is the object of this invention, I construct this machine as shown in the accompanying sheets of drawings which illustrate this invention fully and clearly, and in which—

Figure 1 is a sectional plan on line $z\ z$ of Fig. 2, and Fig. 2 a sectional front-elevation of a portion of this improved machine in line $x\ x$ of Fig. 3. Fig. 3 is a longitudinal sectional elevation of the same in line $y\ y$ of Fig. 2. Fig. 4 is an end view of the forward part of the guard. Fig. 5 is a longitudinal sectional elevation showing a modified construction of the guard. Fig. 6 is a front-elevation similar to Fig. 2.

Like parts are designated by corresponding symbols or characters of reference in all the figures.

A, in these drawings designates the axle, and B the wheels of the machine.

C is the shaft upon which the parts constituting the picking mechanism revolve, D being one of the columns, and E one of the series of spindles.

F, is the grate, of usual construction located a suitable distance above the ground and through which the fingers E pass while revolving around their own axis and around the central shaft C, the parts and elements heretofore described being those to which my improvements are especially applicable.

G, is a guard located below the grate F and in close proximity to the ground over which the machine is moved. This guard is composed of two similar companion pieces (except that they are right and left) $G^1\ G^2$, properly suspended from, and supported by, hangers H $H^1$ as clearly illustrated in the figures. The forward ends of these guard-members are outwardly flared or curved at $g$, and upwardly curved at $g^1$, while at their rear ends there are a series of slots $a$, corresponding in number and position with the number and position of the fingers E in one of the series of fingers. These slots $a$, or rather the bars separating the slots, are upwardly tapered and terminate in blunt edges, as shown in Fig. 2.

K, is the skirt from which the guard-members $G^1\ G^2$ are suspended or to which they are attached.

L are inserts, removably secured to the opposing inner edges of the guard-members G¹ G² by means of screws b, there being excisions in said guard-members for the reception of these inserts L.

By reference to Fig. 1 it will be seen that the companion guard-members G¹ G² are placed a certain distance apart so as to afford a passage P, between them, which passage may be widened or enlarged by removing the inserts L. In its passage over the field, the guard G moves in close proximity to the ground so that the stalks of the cotton-plants are gathered by the forward, enlarged, end of the passage P while the usual apron, not shown, depresses the bushes, and then the stalks pass through the passage P while the bushes pass through the space confined by the said grate, the skirt and the guard. They are thereby compressed or temporarily contracted in bulk into the comparatively narrow space formed by the members just mentioned so that the revolving fingers may remove the cotton lint from their bolls. Thus, the guard G forms, as it were, a bottom to a receptacle consisting of the said guard, skirt and grate, thereby preventing any of the limbs or branches of the cotton bushes ever touching the ground and thereby also avoiding the necessity of the picking fingers being lowered beyond the lower surface of the guard. This guard, covering the ground or soil where the picking is being done at the time when the machine is moving over the same, prevents the picking fingers from coming in contact with any obstruction that may exist in the field so that any injury to those rather delicate fingers is next to impossible.

In harvesting cotton some of the lint is liable to drop out of the bolls and fall upon the ground, especially so when the bushes are slightly shaken as they naturally will be when the machine is passing over the same. This cotton is difficult to pick up by the picking fingers, a matter which is almost entirely avoided by the introduction of the moving guard heretofore described which, as stated, forms, as it were, the bottom of a receptacle upon which this loose cotton will fall and from which the fingers can readily remove the same.

I have mentioned the fact that the bars constituting the rear portion of the guard are tapering so that the spaces between the bars are wider at the apex of the bars than at the bottom thereof. This wedge-shaped construction of the spaces prevents the fingers from pushing lint adhering thereto, through the slots a and passage P, since the tapering contour of the slots has a compressing effect upon the lint adhering to said fingers.

In the cotton field the plants are sometimes irregularly grown, that is to say, not in a longitudinally straight line, and in order to gather the stalks of such irregularly-grown plants, I have devised the removable inserts in the guard which, by widening the passage P provides for the plants a wider lateral space in their passage through this passage.

In Fig. 3 I have shown the guard G being horizontally disposed, and in most cases this construction is sufficient to cover the ground adjacent to the plants while the latter are being "picked." In some cases, however, it is desirable that the rear-end of this guard G be located nearer to the grate F than its front-end, in order that the space through which the bushes are passing be contracted to still further compress the bushes while the machine is passing over the same. In this case I prefer to hinge the guard at its forward end either to the hanger H¹, as illustrated in Fig. 3, or to the forward end of the skirt K, as shown in Fig. 5 and to provide for means S for elevating the rear end which may be actuated by the person riding upon, and operating, the machine. I have also described this guard as being composed of two companion members, but I desire it distinctly understood that any other construction may be adopted without departing from my invention which broadly consists in supplying a cotton harvester with a guard which is located close to, and forms a temporary covering for, the ground adjacent to the cotton bushes or plants while the picking of the lint is taking place.

Having thus fully described my invention, I claim as new and desire to secure to me by Letters Patent of the United States—

1. In a cotton harvester a guard consisting of parallel companion members, said members having excisions in their opposing edges, and inserts in said excisions.

2. In a cotton harvester, a guard adapted to cover the ground adjacent to the cotton plants while the latter are being picked, said guard being located in close proximity to and adapted to move over the ground, said guard consisting of two parallel companion members placed a suitable distance apart and having their forward ends outwardly flared and fitted with removable inserts.

3. In a cotton harvester, a guard, adapted to be moved in close proximity to the ground and the plants therein while being picked, said guard consisting of companion members, the forward ends of which are outwardly flared, and being placed a suitable distance apart, means for varying the distance between said companion members, and means for raising the rear end of said members.

4. In a cotton harvester, a guard adapted to move over, and close to, the ground upon which the harvester is moving, there being in said guard a longitudinal slot for the passage of the stalks of the cotton plants; skirts on both sides of said guard forming between them an enlarged chamber for the cotton bushes, said guard being hinged at its forward end, and means for elevating the rear end of said guard, whereby a chamber is formed in the harvester which is more shallow at its rear end than at its front end.

In testimony that I claim the foregoing as my invention I have hereunto set my hand in the presence of two subscribing witnesses.

ORLEY C. HOUGHTON.

Attest:
MICHAEL J. STARK,
H. C. DYER.

Copies of this patent may be obtained for five cents each, by addressing the "Commissioner of Patents, Washington, D. C."